United States Patent [19]
Adey et al.

[11] 3,939,738
[45] Feb. 24, 1976

[54] SPEED RESPONSIVE CONTROL SYSTEM FOR VEHICLE MOTOR & TRANSMISSION

[75] Inventors: Anthony John Adey, Slough; Geoffrey Richard French, Weybridge; Gordon Harris Leonard, Gerrards Cross; Malcolm Williams, Solihull, all of England

[73] Assignee: C.A.V. Limited, Birmingham, England

[22] Filed: Apr. 9, 1974

[21] Appl. No.: 459,344

[30] Foreign Application Priority Data
Apr. 14, 1973 United Kingdom............... 18092/73

[52] U.S. Cl. ..................... 74/859; 74/861; 74/866; 123/32 EA
[51] Int. Cl.[2] ..................... B60K 41/04; F02B 3/00
[58] Field of Search ......... 74/866, 858, 752 D, 843, 74/859, 861; 123/32 EA

[56] References Cited
UNITED STATES PATENTS

| | | | |
|---|---|---|---|
| 3,568,652 | 3/1971 | Ahlen | 74/868 X |
| 3,763,720 | 10/1973 | Aono et al. | 74/866 X |
| 3,809,028 | 5/1974 | Luchaco | 123/32 EA |

*Primary Examiner*—Samuel Scott
*Assistant Examiner*—Lance W. Chandler
*Attorney, Agent, or Firm*—Holman & Stern

[57] ABSTRACT

A control system for a vehicle having an engine and a gear box includes an electronic fuel control system for controlling the fuel supplied to the engine by means of a pump. The selection of a particular ratio of the gear box is effected by a control circuit which senses the speed of the vehicle by means of a sensor. When a change in gear ratio is effected, the control system for the gear box provides a signal to the electronic fuel control system which produces a reduction in the amount of fuel supplied to the engine during the gear changing process.

4 Claims, 15 Drawing Figures

SPEED RESPONSIVE CONTROL SYSTEM FOR VEHICLE MOTOR & TRANSMISSION

This invention relates to a control system for a vehicle, the vehicle including an engine which is coupled through a gear box to the transmission of the vehicle, the gear box having means for automatically altering the speed ratio thereof, and the engine of the vehicle having a fuel system including a pump, the control system including an electronic fuel control system for determining the quantity of fuel supplied by the pump to the engine in accordance with various engine parameters and desired operating conditions.

When charging the speed ratio of the gear box in a direction which for a given speed of the vehicle will result in a lower engine speed, it is essential in order to achieve a smooth ratio change, to reduce the speed of the engine before the new ratio is engaged. A skilled driver operating a manually controlled gear box will reduce the engine speed automatically. However in the case of an automatically controlled gear box, the driver will not know exactly when the change of ratio is going to occur, and therefore he is not able to take action to achieve the desired reduction of the engine speed.

According to the invention, in a control system of the kind specified, electrical circuit means is provided operable upon receipt of a signal from the means controlling the operation of the gear box, for providing a further signal to the fuel control system to effect a reduction in the fuel supplied to the engine.

According to a further feature of the invention the further signal is arranged to effect a gradual reduction in the fuel supplied to the engine.

According to a further feature of the invention the return of said further signal to the value which it had before the ration change may be delayed.

According to a further feature of the invention, said further signal when the new ratio has been selected gradually returns to the value which it had before the ratio change, thereby effecting a gradual increase in the quantity of fuel supplied to the engine.

According to a further feature of the invention said signal to the fuel control system to effect an adjustment in the quantity of fuel supplied to the engine is arranged to alter gradually and/or is delayed.

According to a further feature of the invention the means for automatically altering the speed ratio of the gear box may be responsive to electrical signals produced by the fuel control system whereby the vehicle speeds at which the gear ratio changes occur may vary in accordance with an engine operating condition or conditions.

One example of a control system in accordance with the invention will now be described with reference to the accompanying drawings in which.

Figure 1:
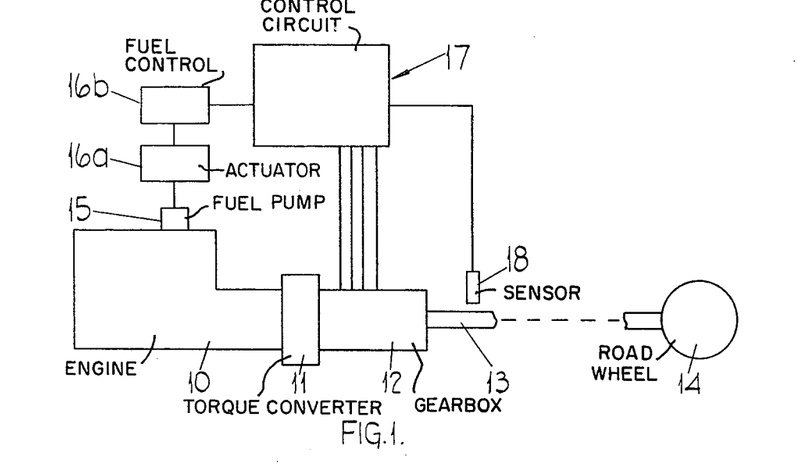
FIG. 1 shows in diagrammatic form an engine and associated vehicle transmission.

With reference to FIG. 1 of the drawings, there is provided an engine 10 which is coupled through a torque converter 11 or a fluid coupling to a mult-ratio gear box 12. The multi-rate gear box is of the epicyclic type, and the individual gear ratios are selected by energisation of solenoids respectively, which either directly or through the intermediary of fluid pressure operable mechanisms, operate brakes associated with the gear ratios respectively. The multi-ratio gear box is coupled by means of a transmission shaft 13 to the road wheels 14 of the vehicle. The engine 10 is provided with a fuel pump 15, and associated with this is an actuator 16a which is controlled by an electronic fuel control system illustrated in 16b.

For controlling the operation of the solenoids there is provided a control circuit generally indicated at 17, and also supplied to this control circuit is a signal which is obtained from a sensor 18, associated with the transmission shaft 13. The sensor 18 is an alternating current generator incorporating a rectifier so as to provide a d.c. output the amplitude of which varies with speed.

Figure 2:
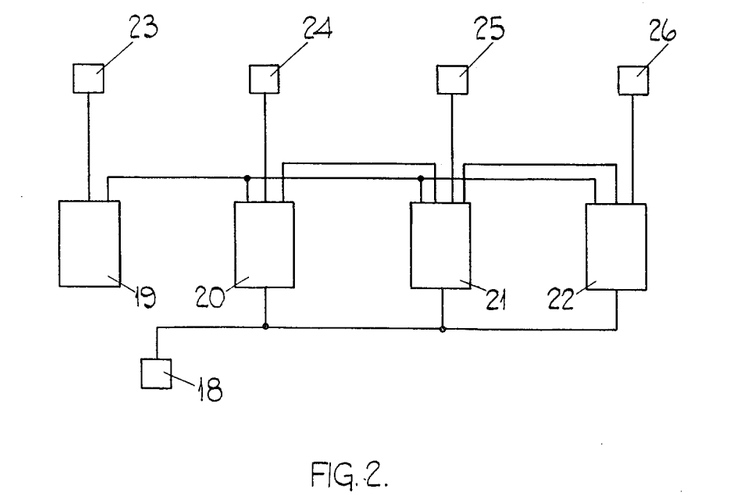
FIG. 2 shows in block form the electrical control circuit which is operative to effect a ratio change of the gear box.

With reference now to FIG. 2, there is shown in greater detail the content of the control circuit 17, and it will be seen in general to comprise four control networks 19, 20, 21 and 22 which control respective solenoids 23, 24, 25 and 26. Solenoid 23 is associated with the gear ratio of the gear box which will give the highest engine speed for a given road speed whilst solenoid 26 is associated with the gear ratio which will give the lowest engine speed for a given road speed. Solenoids 24, 25 are associated with intermediate gears respectively.

The control networks 20, 21 and 22 are supplied with signals from the sensor 18, and each of these networks is interconnected with the network 19 through a common line, such that when for instance network 21 is in a state such that the solenoid 25 is energised, the networks 19 and 20 will be in a state such that the solenoids 23 and 24 will be de-energised. In addition, it will be noted that network 21 is interconnected with network 20, and that network 22 is interconnected with network 21. The purpose of these interconnections is to ensure that when the road speed of the vehicle is decreasing, a progressive change in the gear ratios will occur.

Figure 3:
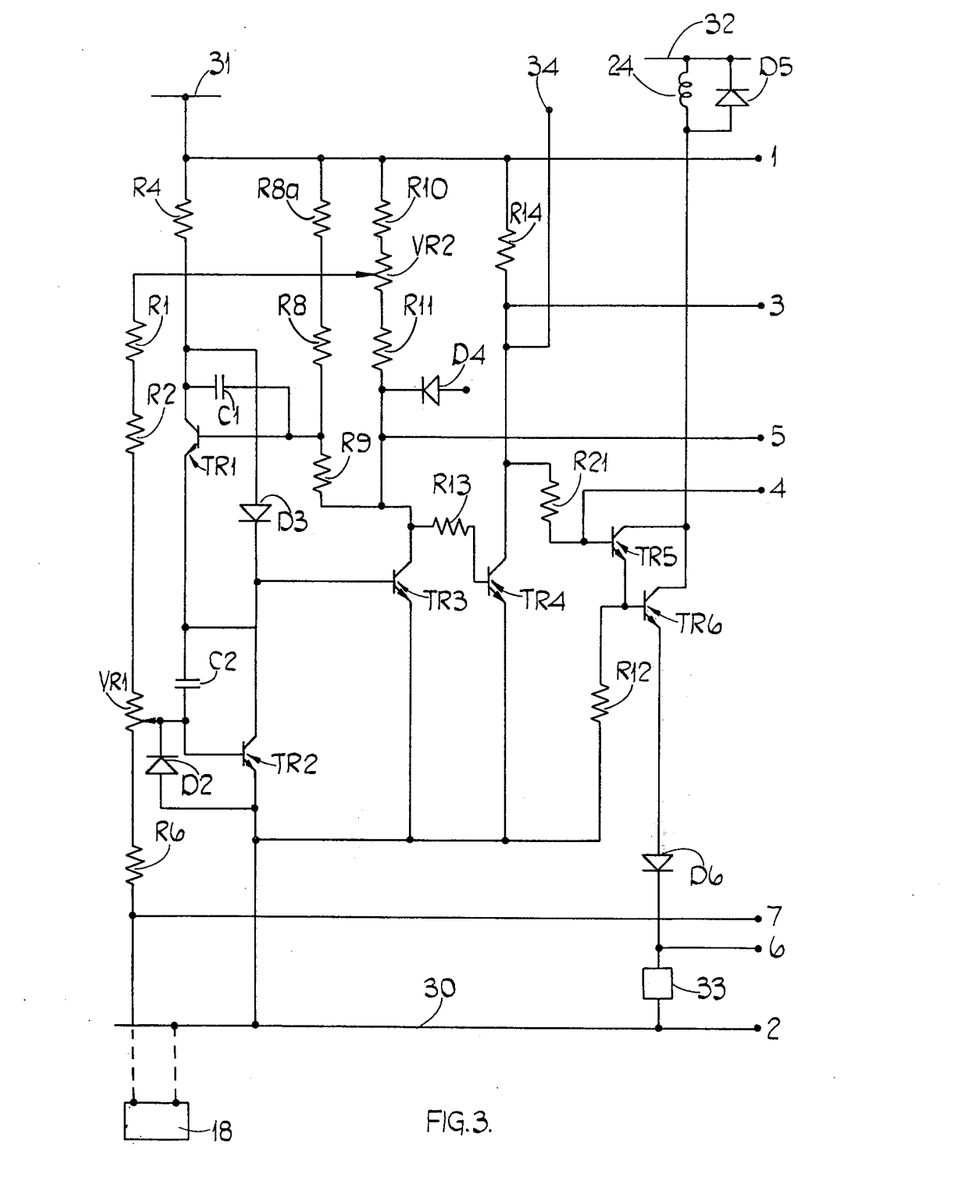
FIG. 3 shows a circuit diagram of part of the circuit of FIG. 2.

With reference now to FIG. 3, there is shown the circuit diagram of the network 20. As shown in FIG. 3 there is provided a negative supply line 30, and a first positive supply line 31, the latter being a stabilised supply, and a second positive supply line 32 which is an unstabilised supply. Also provided is an NPN transistor TR1, the collector of which is connected to line 31 by way of resistor R4, and the emitter of which is connected to the collector of a further NPN transistor TR2. The emitter of transistor TR2 is connected to line 30. The base of transistor TR1 is connected to the junction between resistors R8 and R9, resistor R8 being connected to line 31 by way of resistor R8a and resistor R9 being connected to the collector of a further NPN transistor TR3, the emitter of which is connected to line 30. The base of transistor TR3 is connected to the cathode of a diode D3, the anode of which is connected to the collector of transistor TR1. Interconnecting the collector terminals and base terminals of transistors TR1 and TR2 are capacitors C1 and C2 respectively.

The base of transistor TR2 is connected to the slider of a potentiometer VR1 and one end of the resistance element of this potentiometer is connected to resistors R1 and R2 connected in series, the other end of the series combination being connected to the slider of a second potentiometer VR2. The other end of the resistance element of potentiometer VR1 is connected to the sensor 18 by way of the resistance R6, and the sensor includes a connection to line 30. Moreover, the base of transistor TR2 is connected to the cathode of a diode D2, the anode of which is connected to the emitter of transistor TR2.

One end of the resistance element of potentiometer VR2 is connected by way of resistor R10 to line 31, and the other end of the resistance element of potentiometer VR2 is connected by way of resistor R11 to the collector of transistor TR3. Also provided is an NPN transistor TR4 having its emitter connected to line 30 and its base connected to the collector of transistor TR3 by way of resistor R13. The collector of transistor TR4 is connected by way of resistor R14 to line 31, and also by way of resistor R21, to the base of the first transistor TR5 of a pair of NPN transistors TR5 and TR6, connected as a Darlington pair. The base of transistor TR6 is connected by way of resistor R12 to line 30, and the collectors of the two transistors are connected to one end of the solenoid winding 24, the other end of which is connected to line 32. Moreover, in parallel with the solenoid 24 is a diode D5. The emitter of transistor TR6 is connected to the anode of a diode D6, the cathode of which is connected by way of a subsidiary control circuit 33 to line 30.

The operation of the network thus far described is as follows, and assuming firstly that the control circuit 33 is effectively acting as a closed switch. When the road speed is below a predetermined value, transistors TR1 and TR2 are maintained in the conducting stage with the result that transistor TR3 is held off, and thereby transistor TR4 is held on. This in turn holds transistors TR5 and TR6 off, so that no current flows in the solenoid 24. As the road speed increases the signal produced by the sensor 18 becomes more negative so that a point is reached as determined by the setting of the potentiometers VR1 and VR2, at which transistor TR2 is turned off, and this in turn causes transistor TR1 to turn off. Transistor TR3 is therefore caused to conduct, and this in turn turns transistor TR4 off so that transistors TR5 and TR6 conduct. When this occurs current flow occurs in the solenoid 24 thereby causing selection of the associated gear ratio. When the transistor TR3 conducts a signal is applied by way of diode D4 to all the control networks, but in particular to the control network 19 to effect de-energisation of the solenoid 23. The circuit also includes a terminal 34 which is connected to the collector of transistor TR4 and which is also connected network 21. When network 21 effects energisation of solenoid 25, a signal is applied by way of terminal 34 to turn off transistors TR5 and TR6 thereby to de-energise solenoid 24.

It will be appreciated that the energisation of one solenoid and the attendant de-energisation of another solenoid occurs very quickly and as a result fairly quick selection of the new gear ratio is obtained. The speed of selection of the new gear ratio will inevitably produce a jerk in the transmission of the vehicle which will be detrimental to the vehicle and its transmission. In some instances the jerk will be minimised by slipping of the brake of the newly selected gear, and this of course whilst minimising the jerk imposed on the transmission will result in wear of the brake which will need to be replaced at fairly frequent intervals. In order to overcome this objection means is provided firstly for delaying the energisation of the newly selected solenoid, and secondly for adjusting the engine speed during the period when the gear box has no gear ratios selected.

Figure 4:
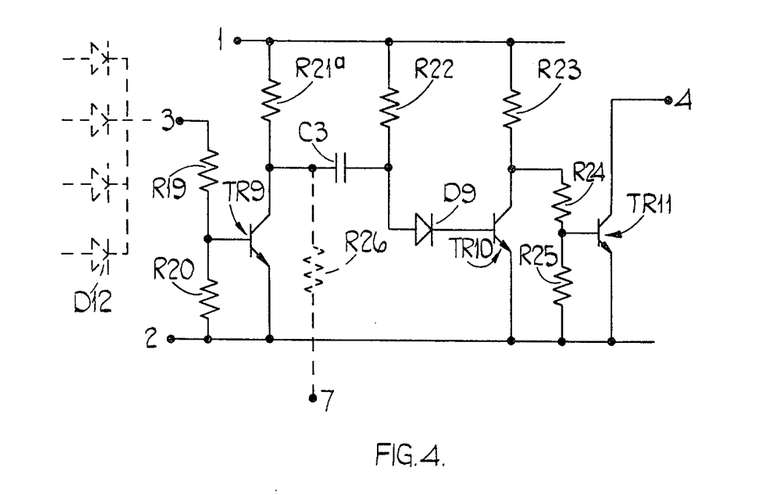
FIG. 4 shows a circuit for attachment to the circuit of FIG. 3.

FIG. 4 shows a circuit for attachment to the circuit shown in FIG. 3, and which provides the required delay in energisation of the solenoid which is controlled by the circuit of FIG. 3. It will be understood that there is a circuit of the type shown in FIG. 3 associated with each of the control networks 19, 20, 21 and 22. It will be noted that various points in the circuit of FIG. 3 are connected to a group of terminals referenced 1–7 at the right hand side of the drawing. Furthermore, it will be noted that the circuit shown in FIG. 4 also is provided with some of these reference numerals to indicate the points of connection.

Considering the circuit of FIG. 4 in detail, there is provided an NPN transistor TR9 having its emitter connected to terminal 2 and its collector connected to terminal 1 by way of resistor R21A. The base of transistor TR9 is connected to a point intermediate resistors R19 and R20, resistor R20 being connected to terminal 2, and resistor R19 being connected to terminal 3. Also provided is an NPN transistor TR10 having its emitter connected to terminal 2, and its collector connected to terminal 1 by way of resistor R23. The base of transistor TR10 is connected to the cathode of a diode D9, the anode of which is connected by way of a resistor R22, to terminal 1. Moreover, the anode of diode D9 is connected by way of capacitor C3 to the collector of transistor TR9. The collector of transistor TR10 is also connected to terminal 2 by way of resistors R24 and R25 in series, and a point intermediate these resistors is connected to the base of an NPN transistor TR11, the emitter of which is connected to terminal 2, and the collector of which is connected to terminal 4.

In operation, below the road speed at which solenoid 24 is energised, transistor TR4 is on so that transistor TR9 is held off, and transistor TR10 is therefore conducting and holds transistor TR11 off. As the road speed increases and transistor TR4 is turned off, transistor TR9 will be turned on. The effect of turning transistor TR9 on is effectively to connect one side of the capacitor C3 to line 2, and this turns transistor TR10 off in turn turning transistor TR11 on, and thereby preventing conduction of the Darlington pair of transistor TR5 and TR6, so that energisation of the solenoid 24 does not occur. It will be appreciated, however, that capacitor C3 gradually charges by way of resistor R22, and a point will be reached at which transistor TR10 will turn on, thereby turning transistor TR11 off and allowing conduction of the Darlington pair TR5 and TR6 so as to permit energisation of the solenoid 24. It will therefore be seen that a delay is obtained in the energisation of the solenoid 24 following switching of transistor TR4.

Figure 5:
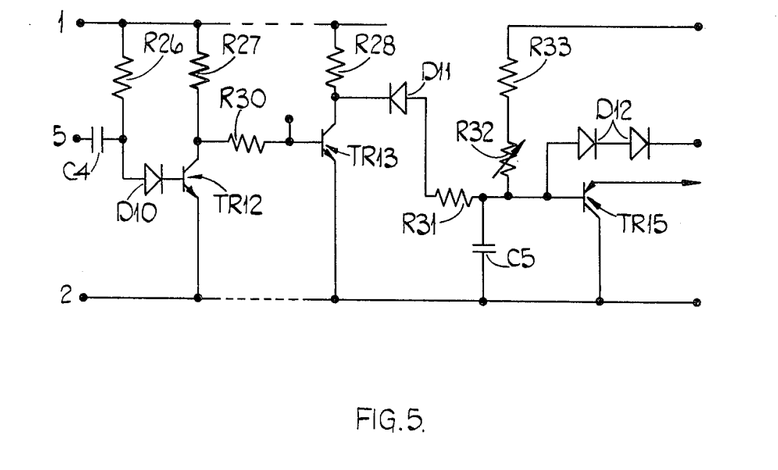
FIG. 5 shows an additional circuit for attachment to the circuit of FIG. 3.

The circuit of FIG. 5 provides a control signal to the fuel control system 16b the latter being described presently, and provides for adjustment in the setting of the fuel pump, and therefore the speed of the engine, when a change in ratio of the gear box is obtained which results in a lower engine speed. Referring now to FIG. 5, there is provided an NPN transistor TR12 having its emitter connected to terminal 2 and its collector connected to terminal 1 by way of resistor R27. The base of transistor TR12 is connected to the cathode of a diode D10, the anode of which is connected to terminal 1 by way of resistor R26, and also to one plate of a capacitor C4, the other plate of which is connected to terminal 5. The collector of transistor TR12 is connected by way of a resistor R30 to the base of an NPN transistor TR13 having its emitter connected to terminal 2 and its collector connected to terminal 1 by way of resistor R28.

In addition, the collector of transistor TR13 is connected to the cathode of a diode D11, the anode of which is connected by way of resistor R31 to the base of a PNP transistor TR15, the collector of which is connected to terminal 2. Moreover, connected between the base of transistor TR15 and its collector is a capacitor C5. The base of transistor TR15 is also connected by way of resistors R32 and R33 in series, with a positive supply line which may be the supply rail 31 or alternatively, can be a positive supply rail of the fuel control system. In addition, the base of transistor TR15 is connected to the anode of one of a pair of diodes D12 connected in series, the cathode of the other diode being connected to a positive supply rail which may be a supply rail of the fuel control system and having a potential preferably midway between the potential of the supply rails 30, 31.

It will be noted that the circuit of FIG. 5 is divided by a pair of dotted lines. The portion of the circuit to the right of the dotted lines is common to all the actuator networks, whereas that to the left of the circuit is individual to each actuator network. In use, assuming that the road speed is below the speed at which a change is required, transistor TR3 will be off so that the potential at terminal 5 will be substantially equal to the potential at terminal 1. Transistor TR12 will therefore be conducting and this will hold transistor TR13 off, so that the potential of its collector will be substantially equal to that of the supply rail 31. In this event, the potential of the base of transistor TR15 will be slightly higher than the potential of the mid-supply rail, and transistor TR15 will be in a non-conducting state.

When the vehicle speed increases, transistor TR3 is turned on and this has the effect of connecting terminal 5 to terminal 2 so that transistor TR12 will be turned off for a short period, and this in turn will cause transistor TR13 to be turned on, thereby bringing its collector potential down to approach that of the supply rail 30. When this occurs, the base potential of transistor TR15 will be reduced and conduction of the transistor will occur. After a predetermined time, capacitor C4 will charge through resistor R26, so that transistor TR12 will again be turned on, and transistor TR13 will be turned off. When this occurs, capacitor C5 will gradually charge and in so doing the conduction of transistor TR15 will gradually decrease until a point is reached at which it is turned off completely. It will be seen, therefore, that a control signal will be supplied to the fuel control system, the signal rapidly increasing when a gear change is signalled and the signal gradually decreasing after a pre-determined time. The signal is arranged to effect a rapid reduction in the fuel supplied to the engine followed by a gradual increase in the fuel supply.

Figure 6:
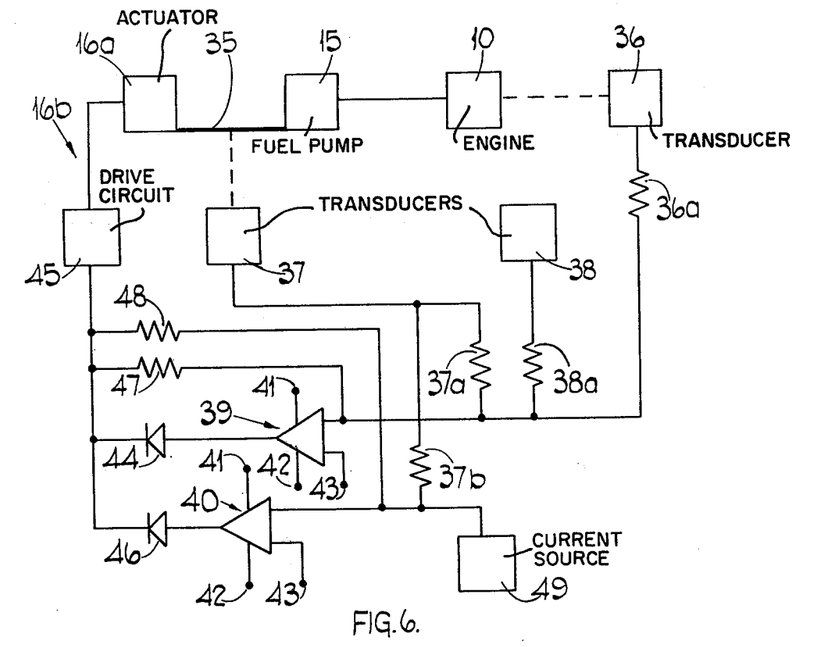
FIG. 6 shows a block diagram of the electronic fuel control system.
Figure 7:
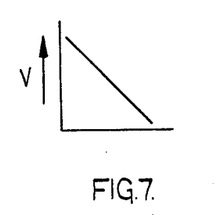
FIGS. 7, 8 and 9 show various operating curves for items forming part of the fuel control system.
Figure 8:
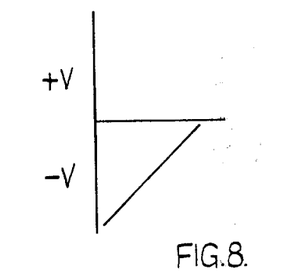
Figure 9:
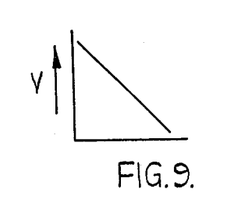

With reference now to FIG. 6, the engine 10, fuel pump 15 and electro-mechanical actuator 16a have already been discussed. The actuator is connected to the control rod 35 of the pump, and the fuel control system 16b includes three transducers 36, 37 and 38. The transducer 36 produces an output in the form of a voltage which is shown in FIG. 7, the magnitude of the voltage being dependent on the rotational speed of the engine. The transducer 37 produces an output voltage as shown in FIG. 9, the voltage being dependent on the rate of supply of fuel to the engine, that is to say the pump output. For this purpose the transducer 37 conveniently senses the position of the control rod 35. The transducer 38 produces a voltage representing demand, and typically the transducer 38 is controlled by the accelerator pedal of the vehicle which is driven by the engine. In the particular example being described, the governor is an all speed governor so that the output from the transducer 38 is a voltage representing demanded engine speed. The form of voltage is shown in FIG. 8, and it should be noted that the slope of this output is opposite to the slopes of the outputs from the transducers 36, 37.

The outputs from the transducers 36, 37 and 38 are applied by way of resistors 36a, 37a and 38a, which convert the signals to current signals, to the inverting terminal of an operational amplifier 39 connected as a summing amplifier. Moreover, the output from transducer 37 is connected through a resistor 37b to the inverting terminal of a further operational amplifier 40, also connected as a summing amplifier. The amplifiers 39, 40 are powered from positive and negative supply terminals 41, 42 and have their non-inverting terminals applied to a terminal 43 which is at a reference potential intermediate (preferably midway) the potentials of the terminals 41 and 42. The output from the amplifier 39 is passed through a diode 44 to a drive circuit 45 which incorporates a power amplifier and which serves to control the electro-mechanical actuator 16a. Similarly, the output terminal of the operational amplifier 40 is connected by way of a diode 46 to the drive circuit 45. The diodes 44, 46 together constitute a discriminator which ensures that only the amplifier 39, 40 which is producing the more positive output is coupled to the drive circuit 45 at any given instant. Thus, if the amplifier 39 is producing the more positive output then the diode 46 is reverse biased and if the amplifier 40 is producing the more positive output, the diode 44 is reverse biased. Feedback resistors 47, 48 are associated with the amplifiers 39, 40 respectively, and it will be noted that the feedback circuit for each amplifier is taken from the input terminal of the drive circuit 45. By virtue of this arrangement the effect of the forward voltage drop across the diodes 44, 46 is reduced by a factor dependent upon the amplifier open loop gain, so that the effect of variation of this parameter with temperature is rendered negligible. Also there is a very sharp changeover from control by one amplifier to control by the other amplifier.

The base operation of the circuit shown in FIG. 6 will be described firstly ignoring the input to the inverting terminal of the amplifier 39 from the transducer 37. The amplifier 39 receives a current input representing demanded speed, and also a current input representing actual speed. These inputs are of opposite polarity as seen in FIGS. 7 and 8, and if the actual is less than the demanded speed, then the amplifier 39 produces an output which is fed to the drive circuit 45, and causes the pump output to increase so that the engine speed increases. As the demanded and actual signals approach one another, the output from the amplifier 39 becomes such that the drive circuit 25 produces just sufficient current to maintain the control rod 35 in the position it has assumed. This explanation, however, ignores the input from the transducer 37 and this modifies the operation to provide the required engine characteristics. It will be seen that by virtue of the input from the transducer 37, the amplifier 39 will in fact compare the demanded speed and the actual speed, and change the rate of supply of fuel until these two parameters have a relative value which is determined by the pump output.

The amplifier 40 receives a signal by way of the resistor 37b representing pump output, and also receives a reference current from a reference current source 49. If the pump output exceeds a predetermined value then the amplifier 40 produces a positive output which is more positive than the output of the amplifier 39 so that the diode 44 ceases to conduct as previously explained, and the output from the amplifier 40 provides the signal to the drive circuit 45. It should be noted that a larger positive output from the amplifier 40 than from the amplifier 39, is in fact a demand for less fuel, that is to say inversion occurs between the amplifiers and the pump. When the amplifier 40 is producing an output, the system operates in the same way as when the amplifier 39 is producing an output, to reduce the output of the amplifier 40 to a value such that the output from the drive circuit 45 keeps the control rod 35 in the position it has assumed. The system will stay in this condition until the amplifier 39 demands less fuel than the maximum set by the amplifier 40. When the amplifier 39 demands less fuel, it produces a greater positive output than the amplifier 40, and so takes over the supply of the control signal to the drive circuit 45.

Figure 10:
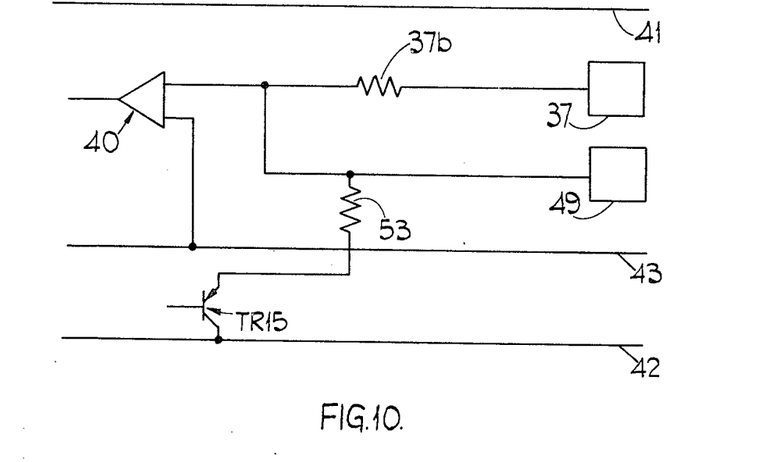
FIG. 10 is a circuit diagram showing the combination of the circuit shown in FIGS. 5 and 6.

FIG. 10 shows the interconnection between the circuits of FIG. 5 and FIG. 6. In FIG. 10 there is shown the three supply rails 41, 42 and 43 of the electronic governor. The potential of rail 43 is midway between that of rails 41 and 42 and rail 43 is connected to the non-inverting input of the amplifier 40. The collector of the transistor TR15 is connected to supply rail 42 and the emitter to the inverting input of the amplifier by way of resistor 53 and the effect of this is that the current supplied to the inverting input is varied depending on the potential at the base of transistor TR15. In practical terms, when transistor TR15 is turned on during a gear change, the effect is that the amplifier 40 produces a larger positive output than the amplifier 39, and a reduction in the quantity of fuel supplied to the engine occurs so that the engine speed rapidly falls. As previously mentioned, transistors TR15 gradually ceases to conduct so that the fuel supply to the engine is gradually increased when the ratio change has been effected.

Whilst the above described circuits operate satisfactorily it has been found that the reduction of fuel supply to the engine can occur very quickly and in some instances the engine responds so quickly to the reduced fuel supply that a snatch occurs before the gearbox has had time to disengage the previously engaged ratio.

Figure 11:
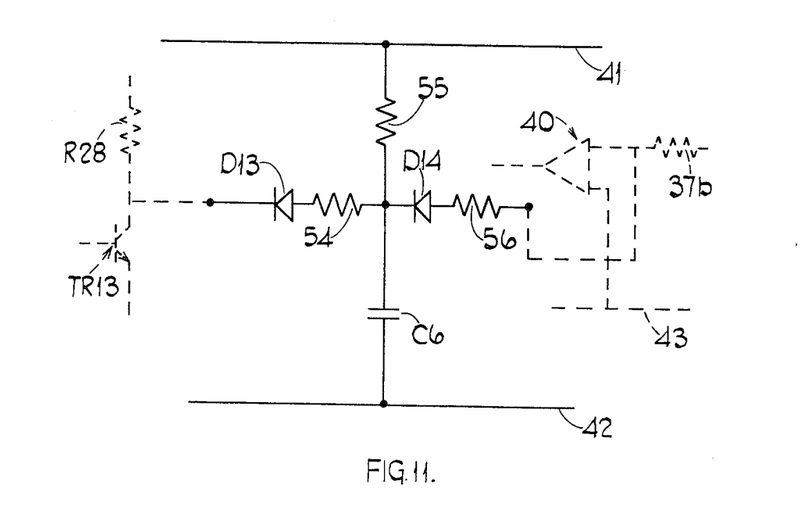
FIG. 11 shows a modification to the circuit of FIG. 5.

In order to overcome this problem the portion of the circuit of FIG. 5 to the right and including diode D11 may be replaced by the circuit shown in FIG. 11. In this circuit a diode D13 having its cathode connected to the collector of transistor TR13, has its anode connected through a resistor 54 to the junction of a resistor 55 and a capacitor C6. The other end of resistor 55 is connected to supply line 41 whilst the other end of the capacitor is connected to supply line 42. Moreover, the junction between the capacitor C6 and resistor 55 is connected to the cathode of a diode D14 the anode of which is connected by way of a resistor 56 to the inverting input of the amplifier 40.

In operation, transistor TR13 is off prior to a gear change selection and therefore capacitor C6 is charged substantially to the potential differences between the supply rails 41 and 42. When a gear change is initiated transistor TR13 conducts and the capacitor starts to discharge through diode D13 and resistor 54. The potential of the junction of resistor 55 and capacitor C6 therefore falls and no current flow occurs in the resistor 56 until diode D14 conducts and the current flowing in the summing junction gradually changes with the result that there is first a delay and then a gradual adjustment in the setting of the control rod of the injection pump in the direction to reduce the quantity of fuel supplied to the engine. When transistor TR13 ceases to conduct the capacitor starts to charge again through resistor 55 and the control rod of the pump is gradually moved to increase the amount of fuel supplied to the engine.

Figure 12:
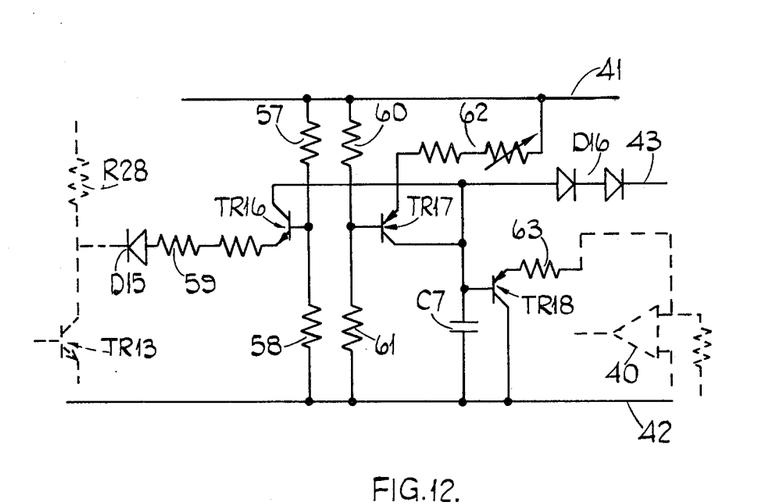
FIG. 12 shows an alternative circuit to the one shown in FIG. 11.

An alternative to the circuit shown in FIG. 11 is shown in FIG. 12. The circuit of FIG. 12 has its input and output connected to the same points as the circuit of FIG. 11. Referring to FIG. 12 there is provided an n-p-n transistor TR16 having its base connected to a point intermediate resistors 57, 58 which are respectively connected to supply rails 41, 42. The emitter is connected by way of a resistor 59 having an adjustable portion to the anode of a diode D15 whose cathode is connected to the collector of transistor TR13. The collector is connected to supply rail 43 by way of a pair of diodes D16 connected in series.

Also provided is a p-n-p transistor TR17 the base of which is connected to the junction of a pair of resistors 60, 61 which in turn are connected to supply rails 41, 42 respectively. The emitter of transistor TR17 is connected by way of an adjustable resistor combination 62 to supply rail 41. The collector of transistor TR17 is connected to the collector of transistor TR16 and to supply rail 42 by way of a capacitor C7. Moreover, the collector of transistor TR17 is connected to the base of a p-n-p transistor TR18 having its collector connected to supply rail 42 and its emitter by way of resistor 63 to the inverting input of amplifier 40.

In operation, assuming that transistor TR13 is non-conducting, transistor TR16 will also be in a non-conducting state and capacitor C7 will be charged to a voltage lying between the voltages on supply rails 41, 42. The transistor TR17 acts as a constant current source, the magnitude of the current being determined by the resistor 62. The voltage to which it is charged above the voltage of the supply rail 43 is determined by the volt drop across the diode D16. When transistor TR13 conducts, transistor TR16 is also rendered conductive and the capacitor is discharged gradually through transistor TR16 resistor combination 59, diode D15 and transistor TR13. The falling capacitor voltage, through transistor TR18, effects variation in the current flowing in the summing junction of the amplifier 40 and produces a similar effect so far as the control rod is concerned as the circuit of FIG. 11, but with different values for the delay and the rate of fuelling change. When transistor TR13 ceases to conduct the capacitor is charged through transistor TR17 the charging current being adjustable by means of the resistor combination 62. This enables the rate of restoration of the fuel supply to the engine following a gear change to be set by the resistor combination 62.

In some instances the gearbox when engagement of a ratio is effected from neutral, may impose an additional and appreciable drag load upon the engine. Manual selection may be effected by closure of the switch constituted by the control circuit 33. If the engine is idling the additional load may be sufficient to upset the idling and possibly even stall the engine. In order to overcome this difficulty it is proposed to sense the engagement of a gear ratio and adjust the idling fuel supplied to the engine. The circuit shown in FIG. 13 is provided for this purpose.

Figure 13:
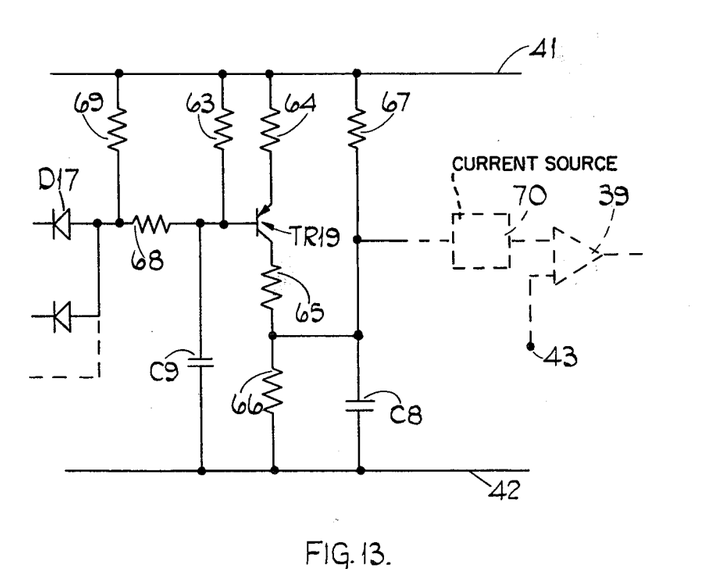
FIG. 13 shows a circuit for connection between the circuit of FIG. 3 and the electronic fuel control system.

With reference to FIG. 13 an n-p-n transistor TR19 is provided having its base and emitter connected to supply line 41 by way of resistors 63, 64 respectively and the collector connected to supply line 42 by way of resistors 65, 66 in series. Resistor 66 is connected to supply line 42 and in parallel with the resistor is a capacitor C8. Moreover, the point intermediate resistors 65, 66 is connected to supply line 41 by way of resistor 67 and the base of transistor TR19 is connected to supply line 42 by way of capacitor C9. The base of the transistor is also connected to one end of a resistor 68 the other end of which is connected to supply line 41 by way of resistor 69, the junction of these two resistors being connected to the anodes of diodes D17. The cathodes of the diodes D17 are connected respectively to the collectors respectively of transistors TR6 which form part of the circuits of FIG. 3.

When any of the solenoids 23 to 26 is energised capacitor C9 is discharged through resistor 68 the respective diode D17 and the base emitter path of the respective transistor TR6. The rate of discharge depends upon the value of resistor 68. At some point transistor TR19 will conduct thereby raising its collector potential and thereby effecting adjustment of the voltage across the capacitor C8. The capacitor voltage is used to vary the current produced by a current source 70 which feeds into the inverting input of the amplifier 39. In this manner the idling setting of the control rod is adjusted when a gear ratio is selected and in the event that the gearbox is placed in neutral the reverse occurs. Capacitor C8 is an optional feature and is used to control the rate of change of the signal to the current source 70. Resistors 64, 65, and 67 determine the idling speed of the engine when any one of the solenoids 23–26 is energised.

Figure 15:
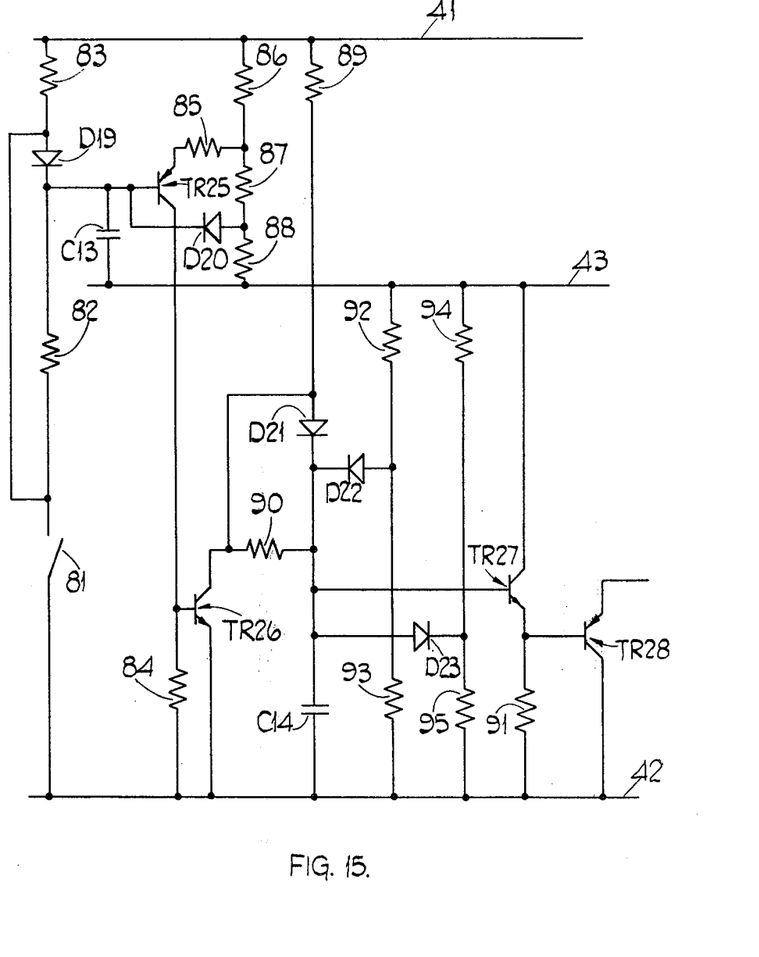
FIG. 15 shows a further alternative circuit to the circuit shown in FIG. 5.

The circuit which is shown in FIG. 15 is an alternative circuit to the common portion of the circuit which is shown in FIG. 5.

Referring to FIG. 15, transistor TR13 is indicated as a switch 81. One terminal of the switch is connected to the supply line 42 whilst the other terminal of the switch is connected to one end of a resistor 82, the other end of which is connected to the cathode of a diode D19. The anode of the diode D19 is connected by way of a resistor 83 to the supply line 41. Moreover, a point intermediate the resistor 83 and the diode D19 is directly connected to the end of the resistor 82 which is connected to the switch.

Also provided is a pnp transistor TR25 having its base connected to the cathode of diode D19 and its collector connected by way of a resistor 84 to supply line 42. The emitter of transistor TR25 is connected by way of a resistor 85 to a point intermediate a pair of resistors 86, 87 which form part of a potentiometer chain including a resistor 88, connected between supply lines 41 and 43. Moreover, a point intermediate resistors 87 and 88 is connected by way of a diode D20 to the base of transistor TR25, and the base of transistor TR25 is connected to one plate of a capacitor C13, the other plate of which is connected to the supply line 43.

There is additionally provided an npn transistor TR26 having its base connected to the collector of transistor TR25 and its emitter connected to supply line 42. The collector of transistor TR26 is connected to supply line 41 by way of a resistor 89 and to the anode of a diode D21. The cathode of diode D21 is connected to one plate of a capacitor C14, the other plate of which is connected to the supply line 42. Moreover, a point intermediate the diode D21 and the capacitor C14 is connected by way of a resistor 90 to the collector of the transistor TR26.

A point intermediate the diode D21 and the capacitor C14 is connected to the base of an npn transistor TR27 having its emitter connected by way of resistor 91 to the supply line 42 and its collector connected to the supply line 43. The emitter of transistor TR27 is connected to the base of a p-n-p transistor TR28 the latter having its collector connected to supply line 42. Moreover, diodes D22 and D23 have their cathode and anode respectively connected to a point intermediate the capacitor C14 and the diode D21. The anode of diode D22 is connected to a point intermediate a pair of resistors 92, 93 which constitute a voltage divider chain between the supply lines 43 and 42. In addition, the cathode of diode D23 is connected to a point intermediate resistors 94 and 95 also constituting a divider chain between the supply lines 43 and 42.

Transistor TR28 is the equivalent of transistor TR15 and is conected in the same manner as is shown in FIG. 10.

In operation, switch 81 is effectively open until a signal is given to effect a change of ratio. Prior to closure of switch 81, capacitor C13 is charged substantially to the potential difference between the supply lines 41 and 43. Moreover, transistors TR25, TR26 and TR28 are in the non-conducting state whilst transistor TR27 is conducting. Moreover, capacitor C14 is charged to a level which is determined by the voltage drop across the diode D23 and the voltage intermediate the resistors 94 and 95.

When switch 81 is effectively closed, capacitor C13 is discharged by way of resistor 82 and at a rate which depends upon the time constant of resistor 82 and capacitor C13. After a predetermined time, transistor TR25 starts to conduct and transistor TR26 is turned on to discharge capacitor C14 by way of resistor 90. The rate of discharge is determined by the time constant of these two components. As capacitor C14 discharges, transistor TR27 acts as an emitter follower and transistor TR28 is rendered conductive. This state of affairs continues until switch 81 is effectively opened. When this occurs capacitor C13 starts to charge by way of resistor 83 and a point is reached at which transistor TR25 is turned off thereby also turning off transistor TR26. Capacitor C14 then is charged through resistor 89 and as the voltage across capacitor C14 increases, transistor TR27 acts as an emitter follower to increase the voltage across resistor 91 which in turn gradually turns transistor TR28 off. The effect of the circuit shown in FIG. 15 is that when switch 81 closes, there is a slight delay before the reduction of fuel occurs. Moreover, the reduction of fuel takes place gradually and this is followed by a period of low fuelling during which disengagement of one ratio occurs. When switch 81 is opened a further delay occurs before the fuel increases, and this is to allow time for the new ratio to be engaged. After this the amount of fuel supplied to the engine is gradually increased.

Figure 14:
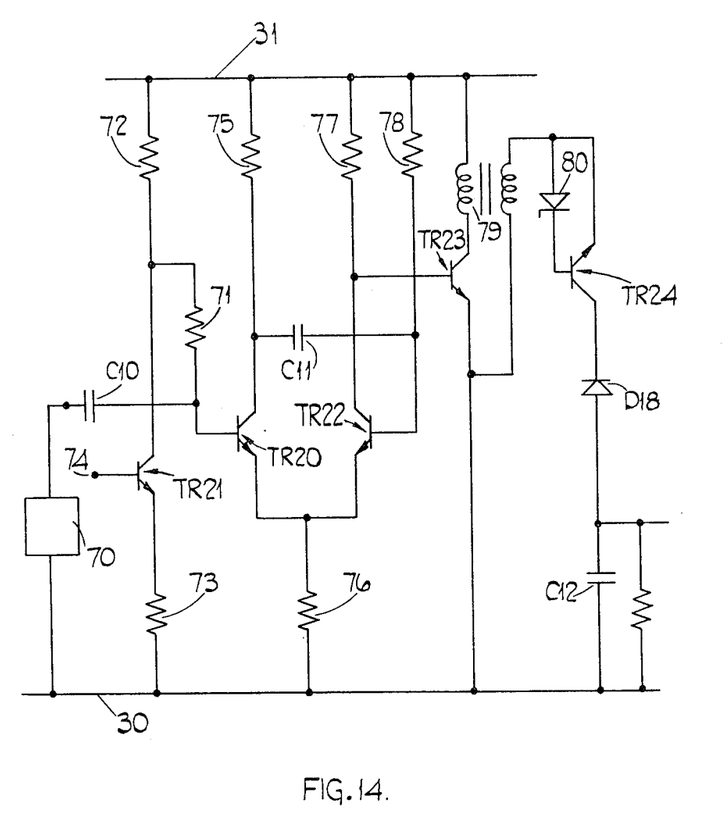
FIG. 14 shows a modification of a portion of the circuit seen in FIG. 3.

In the foregoing description the generator 18 which provides an output voltage which is substantially proportional to the speed at which the vehicle is driven, may be replaced by the circuit which is shown in FIG. 14 and which includes a pick-up coil positioned adjacent a toothed wheel. The output signal obtained from the pick-up coil is an a.c. signal the frequency of which varies with the speed at which the wheel is driven.

As shown in FIG. 14 the pick-up coil is referenced 70 and one end of the coil is connected to line 30. The other end of the coil is connected by way of capacitor C10 to the base of n-p-n transistor TR20. The base of transistor TR20 is also connected to one end of a resistor 71 the other end of which is connected to the collector of n-p-n transistor TR21 and to line 31 by way of resistor 72. The emitter of transistor TR21 is connected to line 30 by way of resistor 73. The base of transistor TR21 is connected to terminal 74 the purpose of which is to be described.

Transistor TR20 has its collector connected to line 31 by way of resistor 75 and its emitter connected to line 30 by way of resistor 76 which also is connected to the emitter of an n-p-n transistor TR22. The collector and base of transistor TR22 are connected to line 31 by way of resistors 77 and 78 respectively and the base is connected to the collector of transistor TR20 by way of capacitor C11.

Also provided is a transformer 79 the ends of the primary winding of which are connected to line 31 and the collector of an n-p-n transistor TR23 respectively. The base of transistor TR23 is connected to the collector of transistor TR22 and the emitter of transistor TR23 is connected to line 30. One end of the secondary winding of the transformer is connected to line 30 and the other end is connected to the anode of Zener diode 80 and the emitter of n-p-n transistor TR24 the base of which is connected to the cathode of the Zener diode. The collector of the transistor is connected to the cathode of a diode D18 the anode of which is connected to one plate of a capacitor C12 the other plate of which is connected to line 30. The output is taken from a point intermediate the capacitor C12 and the diode D18 the output being connected to terminal 7 of the circuit of FIG. 3.

In use, transistor TR20 and TR22 and associated components act as a monostable pulse generator which is triggered by pulses from the coil 70. The secondary winding of the transformer is connected to a constant current charging circuit for the capacitor C12 and therefore the voltage across the capacitor is dependent upon the frequency of the input signal derived from the coil 70.

The time constant of the monostable pulse generator depends upon the potential at the junction of resistors 71 and 72 and this may be varied by allowing current flow in the transistor TR21. This is achieved by supplying an input control signal to terminal 74. This input control signal may be obtained from a suitable point in the fuel control system so that the transmission speed control signal at terminal 7 may therefore be modified in accordance with a desired or actual engine operating condition. Means not shown is provided to ensure that the potential at the collector of TR21 does not fall to a value which would prevent operation of the mono-stable pulse generator.

In a further modification not shown the speed signal required for the control of the networks 19, 20, 21, 22 is derived from the engine speed transducer 38. The signal produced by the transducer is modified by a series of potential dividers controlled by the networks so that the outputs of the networks is representative of gearbox output shaft speed. In this arrangement provision may be made for compensation for torque convertor/fluid coupling slip.

We claim:
1. A control system for a vehicle, the vehicle including an engine which is coupled through a multi-ratio gear box to the transmission of the vehicle, ratio engaging means for selecting the gear ratios of the gear box respectively, the engine have a fuel system including a pump, the control system including control networks associated with the ratio engaging means respectively, means responsive to the speed of the vehicle for supplying a vehicle speed signal to the control networks, said networks being arranged to effect a change in the selected ratio of the gear box as the vehicle speed increases, the control system also including an electronic fuel control system for adjusting the quantity of fuel supplied to the engine by the pump in accordance with an engine parameter and a desired operating condition, the control system also including first electrical circuit means responsive to a change in the state of a component in one of the control networks as occurs when the particular network is effecting engagement of a new ratio, said first electrical circuit means effective a temporary change in a control signal of the electronic fuel control system to produce a temporary reduction in the quantity of fuel supplied to the engine, a temporary reduction in the quantity of fuel supplied to the engine, said first electrical means including means for delaying the temporary change in the control signal of the electronic fuel control system and further means for causing a gradual change in said control signal whereby the quantity of fuel supplied to the engine is gradually reduced, second electrical circuit means associated with said control networks respectively for delaying engagement of the new ratio, and said first electrical circuit means being divided into first and second portions, there being as many of said first portions as there are control networks and there being provided a single second portion, each of said first portions providing a control pulse of a predetermined time duration for said second portion when the associated control network is effecting engagement of its associated gear ratio.

2. A control system as claimed in claim 1 in which at the end of the control pulse in which the means for delaying the temporary change in said control signal and the means for causing a gradual change in said control signal act to delay the reversion of the control signal and to effect gradual reversion of the control signal respectively to its original state prior to the change in gear ratio.

3. A control system as claimed in claim 2 including third circuit means for varying a further control signal of the electronic fuel control system, said further control signal when a ratio of the gear box is selected effecting a change in the amount of fuel supplied to the engine for idling purposes as compared with the situation when no ratio is selected.

4. A control system for a vehicle the vehicle including an engine which is coupled through a multi-ratio gear box to the transmission of the vehicle, ratio engaging means for selecting the gear ratios of the gear box respectively, the engine have a fuel system including a pump, the control system including control networks associated with the ratio engaging means respectively, means responsive to the speed of the vehicle for supplying a vehicle speed signal to the control networks, said networks being arranged to effect a change in the selected ratio of the gear box as the vehicle speed increases, the control system also including an electronic fuel control system for adjusting the quantity of fuel supplied to the engine by the pump in accordance with an engine parameter and a desired operating condition, the control system also including first electrical circuit means responsive to a change in the state of a component in one of the control networks as occurs when the particular network is effecting engagement of a new ratio, said first electrical circuit means effecting a temporary change in a control signal of the electronic fuel control system to produce a temporary reduction in the quantity of fuel supplied to the engine, the control system including further circuit means for varying a further control signal of the electronic fuel control system, said further control signal when a ratio of the gear box is selected effecting a change in the amount of fuel supplied to the engine for idling purposes as compared with the situation when no ratio is selected.

* * * * *